United States Patent
Mittler et al.

(10) Patent No.: US 11,371,610 B2
(45) Date of Patent: Jun. 28, 2022

(54) FLUTTER-SUPPRESSION PISTON RING

(71) Applicant: FEDERAL-MOGUL BURSCHEID GMBH, Burscheid (DE)

(72) Inventors: Richard Mittler, Burscheid (DE); Nigel Gray, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 382 days.

(21) Appl. No.: 16/495,513

(22) PCT Filed: Mar. 8, 2018

(86) PCT No.: PCT/EP2018/055761
§ 371 (c)(1),
(2) Date: Sep. 19, 2019

(87) PCT Pub. No.: WO2018/172091
PCT Pub. Date: Sep. 27, 2018

(65) Prior Publication Data
US 2020/0096103 A1 Mar. 26, 2020

(30) Foreign Application Priority Data
Mar. 20, 2017 (DE) .......................... 102017105952.0

(51) Int. Cl.
| | |
|---|---|
| *F16J 9/20* | (2006.01) |
| *F02F 5/00* | (2006.01) |
| *F02B 3/06* | (2006.01) |
| *F02B 75/02* | (2006.01) |
| *F02F 3/00* | (2006.01) |

(Continued)

(52) U.S. Cl.
CPC .................. *F16J 9/20* (2013.01); *F02F 5/00* (2013.01); *F02B 3/06* (2013.01); *F02B 2075/025* (2013.01); *F02F 3/00* (2013.01); *F16J 9/22* (2013.01); *F16J 9/26* (2013.01)

(58) Field of Classification Search
CPC ........ F16J 9/08; F16J 9/20; F16J 9/206; F16J 9/22; F16J 9/26; F02F 5/00; F02F 3/00
See application file for complete search history.

(56) References Cited

U.S. PATENT DOCUMENTS

| | | |
|---|---|---|
| 3,727,927 A | 4/1973 | Packard |
| 3,980,310 A * | 9/1976 | Packard ................. B23P 15/06 |
| | | 277/466 |

(Continued)

FOREIGN PATENT DOCUMENTS

| | | |
|---|---|---|
| DE | 10 2014 108973 A1 | 12/2015 |
| WO | WO 2014/194875 A1 | 12/2014 |

*Primary Examiner* — Grant Moubry
*Assistant Examiner* — James G Moubry
(74) *Attorney, Agent, or Firm* — Robert L. Stearns; Dickinson Wright, PLLC

(57) ABSTRACT

A piston ring is provided, in particular a compression piston ring having at least one recess with a lower edge running obliquely to the upper piston ring flank on its upper piston ring flank, the ring flank extending radially outward from the piston ring interior and radially inward from the piston ring bearing surface. The piston ring has a chamfer, which is opposite at least one recess. At least one recess and the chamfer extend in the radial direction up to at most the center of the cross-sectional area of the piston ring.

28 Claims, 3 Drawing Sheets

(51) Int. Cl.
*F16J 9/22* (2006.01)
*F16J 9/26* (2006.01)

(56) References Cited

U.S. PATENT DOCUMENTS

| | | | | |
|---|---|---|---|---|
| 4,681,326 A | * | 7/1987 | Kubo | F16J 9/12 |
| | | | | 277/447 |
| 4,736,586 A | * | 4/1988 | Kawajiri | F02G 1/0535 |
| | | | | 277/451 |
| 6,470,792 B1 | * | 10/2002 | Michel | F16J 9/20 |
| | | | | 92/208 |
| 10,125,870 B2 | * | 11/2018 | Mittler | F16J 9/20 |
| 2010/0117305 A1 | * | 5/2010 | Gallas | F16J 9/206 |
| | | | | 277/460 |
| 2016/0123466 A1 | * | 5/2016 | Schulte-Sasse | F16J 9/20 |
| | | | | 277/434 |

\* cited by examiner

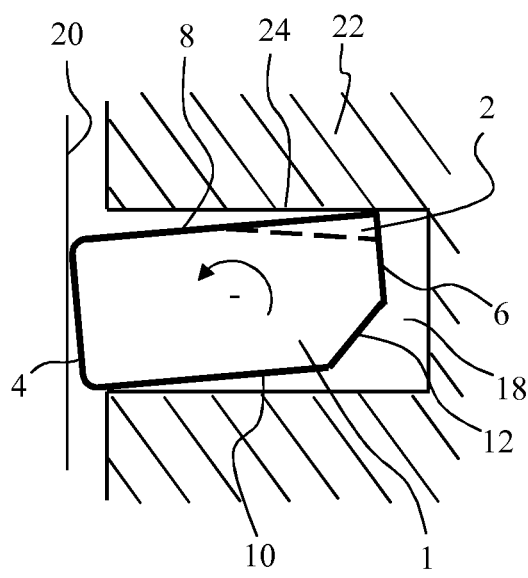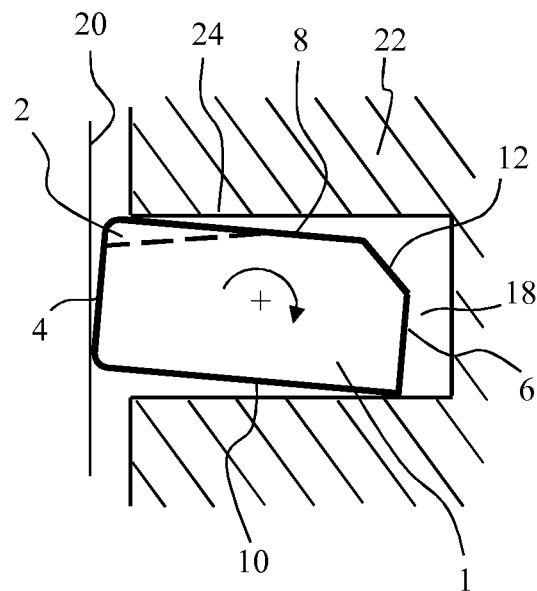
Fig. 2A　　　　　　　　Fig. 2B
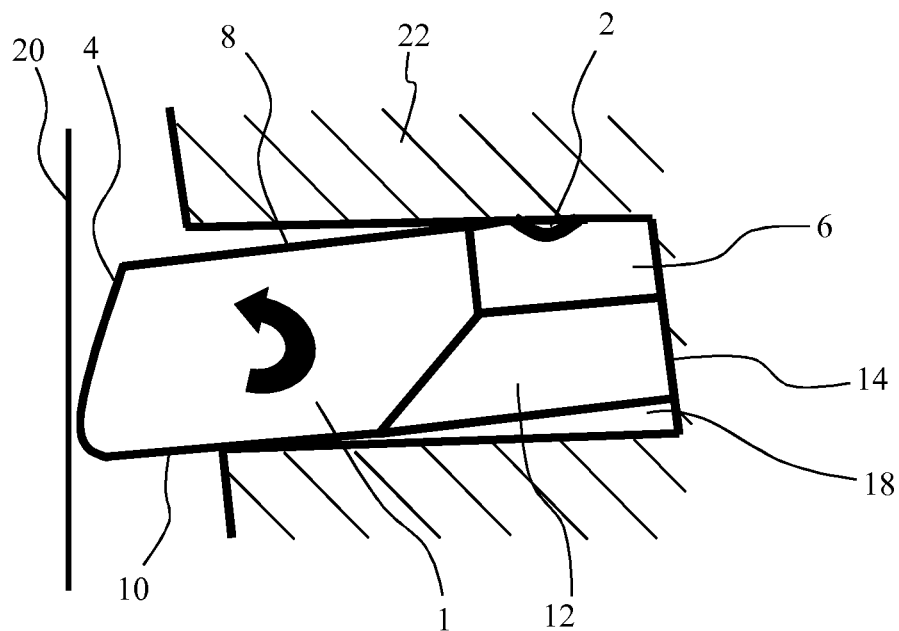
Fig. 3

FLUTTER-SUPPRESSION PISTON RING

BACKGROUND

1. Technical Field

The present invention relates to piston rings for internal combustion engines, in particular compression piston rings.

2. Related Art

Compression rings become unstable in the second piston ring groove at high engine speeds, i.e., the ring begins to wobble radially and/or axially, which results in gas blow-by through the resulting gap between the cylinder wall and the piston ring bearing surface. Radial or axial ring wobble is caused by an increase in pressure before the ring when the piston ring is held by forces of inertia on the upper flank. This problem is not corrected by ordinary ring designs, regardless of whether they have a positive twist or a negative twist.

There are known state-of-the-art piston rings, which have recesses or grooves on the upper piston ring flank, i.e., facing the combustion chamber. However, this design leads to an increased risk of ring fracture because of the resulting weakness of the ring.

SUMMARY

There is therefore a need for a piston ring that will effectively suppress ring wobble, on the one hand, while not being susceptible to fracture or other wear, on the other hand.

A piston ring is provided having a piston ring bearing surface, a piston ring interior opposite the piston ring bearing surface and both an upper piston ring flank and a lower piston ring flank, at least one recess being arranged in the upper piston ring flank and extending radially outward, starting from the piston ring interior, such that the lower edge of at least one recess runs obliquely to the upper piston ring flank, and the piston ring has a negative twist in the installed state, the piston ring has a chamfer at the edge between the piston ring interior and the lower piston ring flank, at least one recess and the chamfer extending radially from the piston ring interior up to at most the position of the center of the axial cross-sectional area of the piston ring, and the at least one recess is opposite the chamfer.

A piston ring is further provided having a piston ring bearing surface, a piston ring interior opposite the piston ring bearing surface and an upper and a lower piston ring flank, at least one recess being arranged in the upper piston ring flank, extending radially inward starting from the piston ring bearing surface, a lower edge of the at least one recess running obliquely to the upper piston ring flank, the piston ring having a positive twist in the installed state, the piston ring having a chamfer at the edge between the piston ring interior and the upper piston ring flank, the at least one recess extending from the piston ring bearing surface and the chamfer extending from the piston ring interior in the radial direction up to, at most, the position of the center of the axial cross-sectional area of the piston ring and the at least one recess being opposite the chamfer.

According to one aspect of the present invention, an angle between 3° and 30° may be formed between the lower edge of at least one recess and the upper piston ring flank.

According to another aspect, the radial extent of at least one recess may amount to at most 75% of the radial thickness of the piston ring.

According to another aspect, the quotient of the total volume of at least one recess and the circumference of the piston ring may be in the range of 0.04 mm$^2$ to 0.08 mm$^2$.

According to another aspect, the piston ring may be a rectangular ring, a trapezoidal ring, a minute ring, a nose ring or a nose minute ring.

According to another aspect, a plurality of recesses may be provided, preferably max. 40 recesses being provided.

According to another aspect, each recesses has the same shape.

According to another aspect, the recesses may be arranged with the same spacing from one another in the circumferential direction.

According to another aspect, the axial height of the piston ring may be adjusted, so that the axial clearance remains at most 50 μm in the piston ring groove in which it is to be installed.

This object is also achieved by a combination of a piston with a piston ring groove and a piston ring according to the preceding features.

According to another aspect of the combination, the piston ring groove may have an axial height that is greater than the axial height of the piston ring by 0 μm to 50 μm, preferably by 20 μm to 40 μm.

According to another aspect of the combination, the axial height of the piston ring groove may decrease radially toward the inside.

According to another aspect of the combination, the angle between the upper piston ring groove flank and the lower piston ring groove flank in an axial cross section may be 0.3°-1°.

According to another aspect of the combination, the outer axial height of the piston ring groove may be greater than the inner axial height of the piston ring groove by at least 30 μm, preferably by 30 μm to 50 μm.

As disclosed herein, the side facing the combustion chamber is also referred to as the top side, while the bottom side is the side facing the crankcase accordingly (side facing away from the combustion chamber). "Axially" refers to a direction parallel to the axis of the annular piston ring; "radially" refers to a direction perpendicular to that. The axial direction corresponds to the axial direction of the piston in which the piston ring is to be used.

In the following description, the phase "at least one recess" is also simplified as "recesses." Unless otherwise indicated, the term "recesses" thus includes a plurality of recesses as well as a single recess. Likewise, a recess provided on the upper piston ring flank and extending radially outward starting from the piston ring interior, is referred to in simplified terms as the "interior recess," and similarly, a recess provided on the upper piston ring flank and extending radially inward, starting from the piston ring bearing surface, is referred in simplified terms as the "exterior recess."

BRIEF DESCRIPTION OF THE DRAWINGS

Examples of embodiments of the invention are described in greater detail below with reference to the figures, in which

FIG. 2A shows a sectional view of a piston ring with a negative twist with interior recesses in the installed condition;

FIG. 2B shows a sectional view of a piston ring with a positive twist with exterior recesses in the installed condition;

FIG. 3 shows a perspective detail view of a piston ring with a negative twist with recesses in the installed condition;

DETAILED DESCRIPTION

Figure 1A:
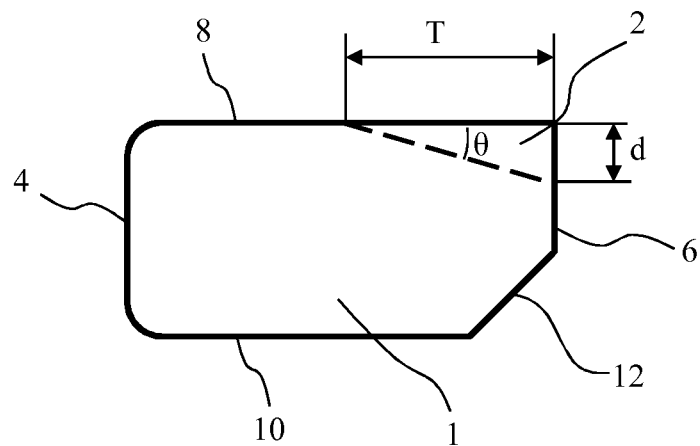
FIG. 1A shows a sectional view of a piston ring according to one embodiment with interior recesses.

FIG. 1A shows a sectional view (without hatching for the sake of simplicity) of a piston ring 1 according to one embodiment of the present invention. The piston ring 1 has a piston ring bearing surface 4, a piston ring interior 6, an upper piston ring flank 8 (on the combustion chamber side) and a lower piston ring flank 10 (on the crankcase side). At least one recess 2, which extends radially outward starting from the piston ring interior 6, is provided on the upper piston ring flank 8. The at least one recess is indicated by a dashed line. See FIG. 3 and FIG. 4 for perspective views. In addition, the piston ring 1 has a chamfer 12 at the edge between the lower piston ring flank 10 and the piston ring interior 6. The chamfer 12 is thus opposite the at least one recess 2 on the piston ring interior 6.

The chamfer is represented as a slant in the figures. However, within the context of the present patent application, the term "chamfer" should be understood more generally to refer to a peripheral recess (running around the circumference of the piston ring) of the piston ring (in the axial cross section). For example, the outside contour of the cross section in the area of the "chamfer" may also be referred to in general as having corners (polygonal), being rounded (concave or convex), etc., except for the case when it is straight, as in the case of a slant.

The recesses facilitate the flow of combustion gases between the upper piston ring flank and the upper flank of a piston groove, in which the piston ring 1 is installed, in comparison with a traditional piston ring (i.e., to reach the piston ring interior) to thereby press the piston ring 1 more strongly against the cylinder wall and improve the sealing effect.

This also makes it possible to minimize the axial clearance, i.e., the clearance between the piston ring flanks and the piston ring groove flanks. In comparison with the usual 60-120 μm, the axial height of the piston ring 1 here is preferably adjusted to the axial height of the piston ring groove in such a way as to leave a clearance of max. 50 μm, preferably 20-40 μm. Therefore, the amount of oil that can flow between piston ring flanks and piston ring groove flanks is reduced, while gas can flow through at least one recess.

Figure 1B:
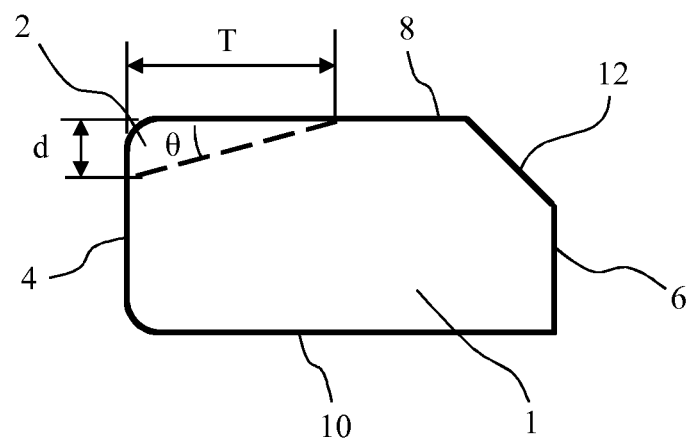
FIG. 1B shows a sectional view of a piston ring according to one embodiment with exterior recesses.

FIG. 1B shows a sectional view of a piston ring 1 according to another embodiment of the present invention. This differs from the view shown in FIG. 1A in that the at least one recess 2 is not located in the interior but instead is on the exterior, and the chamfer 12 of the piston ring 1 is situated at the edge between the upper piston ring flank 8 and the piston ring interior 6. In other words, the chamfer 12 is preferably opposite the at least one recess 2 based on the upper piston ring flank 8. The at least one recess 2 extends radially inward, starting from the piston ring bearing surface 4. The arrangement of the at least one recess 2 on the upper piston ring flank 8 is retained. What was said above with regard to FIG. 1A also applies here as well.

The "twist behavior" of the embodiments described with reference to FIG. 1A and FIG. 1B is explained further below with regard to FIG. 2A and FIG. 2B. Additional features and properties of piston rings according to the invention, which are described below, are applicable to both embodiments according to FIG. 1A and those according to FIG. 1B.

In the radial direction, the recesses 2 do not extend up to the piston ring bearing surface 4 (in the case of interior recesses) and/or up to the piston ring interior 6 (in the case of exterior recesses), i.e., the radial extent of the recesses 2 is smaller than the radial thickness (i.e., the wall thickness) of the piston ring 1; the recesses extend up to max. a position of the center of the axial cross-sectional area of the piston ring. It is preferable here for the radial extent T of the recesses 2 to amount to max. 75%, more preferably 50%, more preferably 25% of the radial thickness of the piston ring 1. The radial extent of the recesses 2 is preferably between 20% and 60%, more preferably between 40% and 60%, of the radial thickness of the piston ring 1.

Similarly, the chamfer 12 extends radially up to the max. position of the center of the axial cross-sectional area of the piston ring. The radial extent of the chamfer 12 preferably amounts to max. 50% of the radial thickness of the piston ring 1.

At least one recess may have different shapes. For example, in addition to cubical shapes and shapes with a rectangular cross section, for example, rounded shapes or shapes having a trapezoidal, triangular or circular segment cross section are also conceivable. The depth (i.e., the extent in the axial direction) of the at least one recess 2 decreases linearly, starting from the piston ring interior 6 and/or the piston ring bearing surface 4 in a radial direction, i.e., a lower edge of the at least one recess 2 runs obliquely to the upper piston ring flank 8. The depth is preferably reduced in such a way that a slant with an angle θ between 3° and 30°, more preferably between 10° and 20°, is formed. In other words, the lower edge of the recesses 2 preferably runs at an angle θ between 3° and 30°, more preferably between 10° and 20°, relative to the upper piston ring flank 8. Different shapes of the recesses may of course also be used on a piston ring at the same time.

Multiple recesses, more preferably at most 40 recesses, are preferably provided. The recesses are preferably arranged regularly in the circumferential direction, i.e., the recesses are situated at uniform distance from one another.

The total area (total cross-sectional area of the passages formed by the recesses when considered in the radial direction), measured on the piston ring interior or the piston ring bearing surface, of the recesses should amount to at least 20 μm multiplied times the piston ring circumference. In other words, if all the recesses have the same shape, which is a rectangular cross section, the following equation is used for the area:

$$L \cdot d \cdot N \geq \pi \cdot D \cdot 20 \text{ μm}$$

where N stands for the number of recesses, L is the length of the recesses in the circumferential direction, d is the axial depth of the recesses (both measured on the piston ring interior or the piston ring bearing surface) and D is the diameter of the piston ring, measured on the piston ring interior in the case of interior recesses or on the piston ring bearing surface in the case of exterior recesses. This condition should be maintained similarly if the recesses have different shapes, i.e., $$t_{ot} \geq \pi \cdot D \cdot 20 \text{ μm}$$

where $_{tot}$ is the total area of the recesses, measured on the piston ring interior or on the piston ring bearing surface.

The total number of recesses can be adjusted to the respective requirements. For example, in the case of a piston ring having a diameter in the range of 60 mm to 150 mm, it is possible to arrange a small number of relatively wide recesses with a length of more than 20 mm in the circumferential direction or to arrange a larger number of relatively narrow recesses with a length of less than 10 mm.

If T denotes the distance over which the recesses extend in the radial direction, i.e., the radial extent of the recesses, then the following equation is preferably applicable for the volume:

$$T \cdot L \cdot d \cdot N \geq \pi \cdot D \cdot 0.04 \text{ mm}^2$$

where it is assumed, as is the case above with the equation for area, that the recesses have a rectangular cross section when considered in the radial direction, and the axial depth of the recesses decreases approximately linearly starting from the piston ring interior or the piston ring bearing surface (in other words, it is assumed that a slant is formed as described above).

If the recesses do not have a rectangular cross section, as seen in the radial direction, but instead have a different shape and if the axial depth of the recesses decreases linearly in the radial direction (as above), then the following equation holds in more general terms:

$$2 \cdot V \cdot N \geq \pi \cdot D \cdot 0.04 \text{ mm}^2$$

where V is the volume of a single recess. If various recesses have different shapes, the equation is:

$$2 \cdot V_{tot} \geq \cdot D \cdot 0.04 \text{ mm}^2$$

where $V_{tot}$ is the total volume of all recesses (again assuming an essentially linear decline in the axial depth of the recesses). Preferably $V_{tot}$ is in the range of $\pi \cdot D \cdot 0.04$ mm$^2$ to $\pi \cdot D \cdot 0.08$ mm$^2$, i.e., in other words, the ratio of the total volume $V_{tot}$ of the recesses 2 and of the circumference $\pi \cdot D$ of the piston ring is in the range of 0.04 mm$^2$ to 0.08 mm$^2$.

FIG. 2A and FIG. 2B show piston rings according to the invention in the installed condition, i.e., when the piston ring is under stress. If there is a so-called "twist," then its interaction with the recesses is explained below. The piston ring shown in FIG. 2A corresponds to the piston ring in FIG. 1A, and the piston ring shown in FIG. 2B corresponds to the piston ring in FIG. 1B. The statements made above with regard to FIG. 1A and FIG. 1B also apply accordingly to the piston rings shown in FIG. 2A and FIG. 2B, respectively. Accordingly, only that which is relevant to the interaction with the twist is described below; reference is made to the preceding explanations for the other features and properties.

FIG. 2A shows a view of a piston ring with a negative twist (corresponding to the piston ring in FIG. 1A) in the installed state. The piston ring 1 is installed in a piston ring groove of a piston 22, and a cylinder wall 20 with which the piston ring is in contact is indicated. The term "negative twist" indicates that the piston ring tilts downward on the outside when it is under stress in the installed state. Such a "twist behavior" is caused by a disturbance in the cross section, which is created in piston rings, for example, by creating a chamfer or a peripheral recess to the ring edge between the piston ring interior 6 and one of the piston ring flanks. Such a chamfer 12 is created on the lower side (i.e., at the edge between the piston ring interior 6 and the lower piston ring flank 10) of the piston ring 1 in this figure, which results in a so-called "negative twist" (in the view shown in this figure, this is a counterclockwise twist, which is indicated by an arrow). The negative twist results in the upper inner edge of the piston ring being in contact with the upper flank 24 of the piston ring groove. In this case, the recesses 2 are arranged on the inside on the upper piston ring flank 8, i.e., where the piston ring 1 is in contact with the upper flank 24 of the piston ring groove.

A chamfer at the upper edge of the piston ring interior 6 accordingly results in a "positive twist" in the installed state. This is shown as an example in FIG. 2B, which illustrates the piston ring according to FIG. 1B in the installed state. In the case of piston ring 1 with a positive twist, the recesses 2 (as in the figure) are arranged so they are on the exterior in the upper piston ring flank 8. The twist of the piston ring (again indicated with an arrow in FIG. 2B) when it is under stress results in the upper piston ring flank 8 being in contact with the upper outer edge of the piston ring groove, i.e., where the recesses 2 are arranged.

In both cases, i.e., both positive and negative twist, the recesses 2 are each arranged in such a way that they are located where the piston ring 1 is in contact with the upper piston groove flank 24. The recesses 2 thus form passages for combustion gases, so that the gases can get behind the piston ring 1, i.e., they can enter into the area 18 between the piston ring interior and the piston groove base. The statements made above in conjunction with FIG. 1A and FIG. 1B are also applicable to FIG. 2A and FIG. 2B, in particular the statements about the dimensions and the area/volume equation.

It is also conceivable for the recesses to be arranged at irregular intervals in order to balance out an irregular twist because the recesses also influence the twist behavior.

Figure 4:
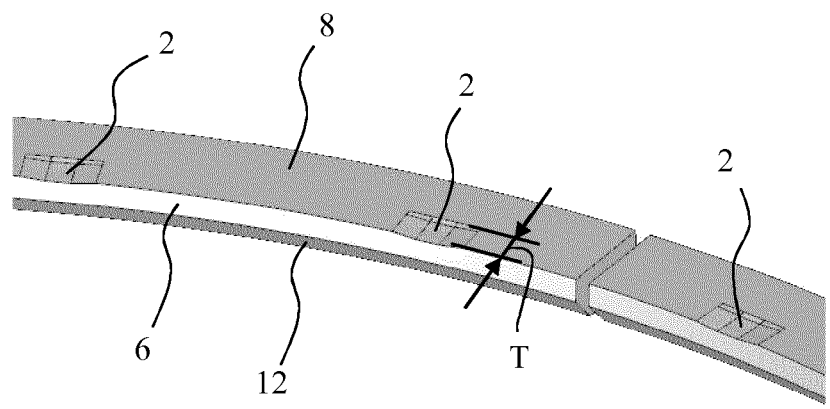
FIG. 4 shows a perspective view of a piston ring with a plurality of recesses.

FIG. 3 and FIG. 4 show perspective views of an embodiment of the present invention corresponding to that in FIG. 1A and FIG. 2A. As shown in FIG. 4 in particular, the recesses 2 create a passage between the outer region, between the cylinder wall 20 and the piston 22, and the region 18 between the piston ring interior 6 and the piston ring groove base 14, which thus allows combustion gas escape and blow-by into the internal region 18 radially between the piston ring interior 6 and the piston ring groove base 14. Due to the pressure of the gas, a radial outward force is applied to the piston ring 1, pressing the piston ring bearing surface 4 against the cylinder wall, so that radial ring wobble is suppressed.

FIG. 4 shows a detail of the piston ring 1 in a perspective view. It should be pointed out here that a plurality of recesses 2 is arranged in the circumferential direction.

Piston rings according to the present invention are provided in particular for a second compression ring. Such a compression ring is preferably designed as a rectangular ring, a trapezoidal ring, a minute ring, a nose ring or a nose minute ring. A piston ring according to the invention is preferably used in a trapezoidal piston ring groove, which becomes wider radially toward the outside, forming an angle of 0.3° to 1° between the piston ring groove flanks.

Figure 5:
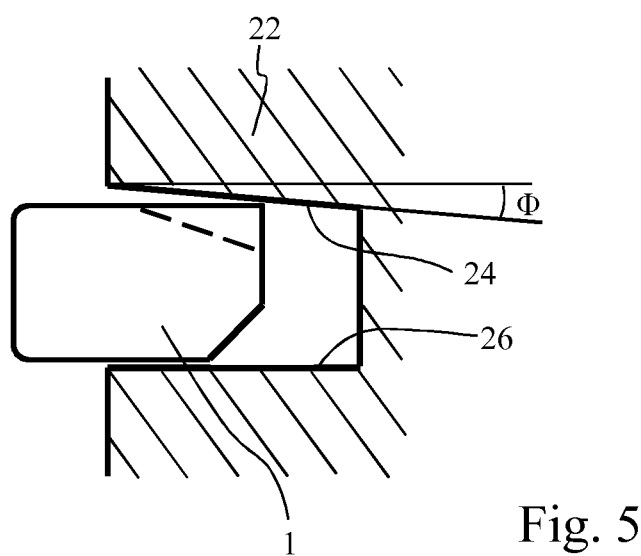
FIG. 5 shows a sectional view of the piston and piston ring.

FIG. 5 shows a combination of a piston 22 with a piston ring 1. The piston ring 1 is a piston ring according to the invention, as described above. For example, a piston ring with recesses in the interior (cf. FIG. 1A) is illustrated here but any other embodiment may also be used. Reference numerals have been omitted for the first part so that only the essential features are illustrated.

The piston 22 has a piston ring groove but even other piston ring grooves may also be present for additional piston rings. The axial height of the piston ring groove is 0-50 μm, preferably 20-40 μm greater than the axial height of the piston ring.

The flanks of the piston ring groove do not run in parallel but instead their spacing decreases radially toward the inside, with an angle Φ being formed between the piston ring groove flanks. As an example, the lower piston ring groove flank 24 here runs parallel to the radial direction (i.e., perpendicular to the axial direction), while the upper piston ring groove flank 26 does not run parallel to it. In general, only one or both (upper or lower) piston ring groove flank(s) 24, 26 cannot run parallel to the radial direction. The angle Φ denotes the angle between the two piston ring groove flanks, i.e., not the angle between the upper piston ring groove flank and the radial direction, as is shown for the sake of simplicity in the figure, but it does correspond to this in the example shown here. The angle Φ is preferably between 0.3° and 1°. The outer axial height (axial outer height) of the piston ring groove is preferably at least 30 μm greater, more preferably 30-50 μm greater, than the inner axial height (axial inner height) of the piston ring groove.

The invention claimed is:

1. A piston ring, comprising a piston ring bearing surface, a piston ring interior opposite the piston ring bearing surface and both an upper piston ring flank and a lower piston ring flank,
   wherein at least one recess extending radially outward, starting from the piston ring interior, is provided in the upper piston ring flank,
   wherein a lower edge of the at least one recess runs obliquely to the upper piston ring flank, wherein the piston ring has a negative twist in the installed state, wherein the piston ring has a chamfer at the edge between the piston ring interior and the lower piston ring flank, the at least one recess and the chamfer extending in the radial direction up to at most the position of the center of the axial cross-sectional area of the piston ring, and the at least one recess is opposite the chamfer.

2. The piston ring according to claim 1, wherein an angle between 3° and 30° is formed between the lower edge of the at least one recess and the upper piston ring flank.

3. The piston ring according to claim 1, wherein the radial extent of the at least one recess amounts to at most 75% of the radial thickness of the piston ring.

4. The piston ring according to claim 1, wherein a quotient of the total volume of the at least one recess, and the circumference of the piston ring is in the range of 0.04 mm²-0.08 mm².

5. The piston ring according to claim 1, wherein the piston ring is a rectangular ring, a trapezoidal ring, a minute ring, a nose ring or a nose minute ring.

6. The piston ring according to claim 1, wherein a plurality of recesses is provided.

7. The piston ring according to claim 6, wherein the plurality of recesses comprises at most 40 recesses.

8. The piston ring according to claim 6, wherein the recesses each have the same shape.

9. The piston ring according to claim 6, wherein the recesses are arranged at a uniform distance from one another in the circumferential direction.

10. The piston ring according to claim 1, wherein the axial height of the piston ring is adjusted so that an axial clearance of of equal to or less than 50 μm remains in the piston ring groove into which the piston ring is to be installed.

11. A combination of a piston with a piston ring groove and the piston ring according to claim 1.

12. The combination according to claim 11, wherein the piston ring groove has an axial height which is 20 μm-40 μm greater than the axial height of the piston ring.

13. The combination according to claim 11, wherein the piston ring groove has an axial height which is 0 μm-50 μm greater than the axial height of the piston ring.

14. The combination according to claim 11, wherein the axial height of the piston ring groove decreases radially toward the inside.

15. The combination according to claim 14, wherein the axial outside height of the piston ring groove is at least 30 μm 50 μm greater than the axial inside height of the piston ring groove.

16. The combination according to claim 14, wherein an angle between the upper and lower piston ring groove flanks in an axial cross section amounts to 0.3°-1°.

17. The combination according to claim 14, wherein the axial outside height of the piston ring groove is at least 30 μm greater than the axial inside height of the piston ring groove.

18. A piston ring comprising a piston ring bearing surface, a piston ring interior opposite the piston ring bearing surface and an upper piston ring flank and a lower piston ring flank,
   wherein at least one recess is provided in the upper piston ring flank, extending radially inward, starting from the piston ring bearing surface,
   wherein a lower edge of the at least one recess runs obliquely to the upper piston ring flank, wherein the piston ring in the installed state has a positive twist, wherein the piston ring has a chamfer on the edge between the piston ring interior and the upper piston ring flank, the at least one recess extending from the piston ring bearing surface, and the chamfer extending radially from the piston ring interior up to at most the position of the center of the axial cross-sectional area of the piston ring, and at least one recess is opposite the chamfer.

19. The piston ring according to claim 18, wherein an angle between 3° and 30° is formed between the lower edge of the at least one recess and the upper piston ring flank.

20. The piston ring according to claim 18, wherein the radial extent of the at least one recess amounts to at most 75% of the radial thickness of the piston ring.

21. The piston ring according to claim 18, wherein a quotient of the total volume of the at least one recess, and the circumference of the piston ring is in the range of 0.04 mm²-0.08 mm².

22. The piston ring according to claim 18, wherein the piston ring is a rectangular ring, a trapezoidal ring, a minute ring, a nose ring or a nose minute ring.

23. The piston ring according to claim 18, wherein a plurality of recesses is provided.

24. The piston ring according to claim 23, wherein the plurality of recesses comprises at most 40 recesses.

25. The piston ring according to claim 18, wherein the axial height of the piston ring is adjusted so that an axial clearance of equal to or less than 50 μm remains in the piston ring groove into which the piston ring is to be installed.

26. A combination of a piston with a piston ring groove and a piston ring according to claim 18.

27. The combination according to claim 26, wherein the piston ring groove has an axial height which is 20 μm-40 μm greater than the axial height of the piston ring.

28. The combination according to claim 26, wherein the piston ring groove has an axial height which is 0 μm-50 μm, greater than the axial height of the piston ring.

* * * * *